(12) United States Patent
Booth

(10) Patent No.: US 7,118,073 B2
(45) Date of Patent: Oct. 10, 2006

(54) SKYHOOK RESERVE PARACHUTE DEPLOYMENT SYSTEM

(76) Inventor: William R. Booth, 2317 E. New York Ave., DeLand, FL (US) 32724

( * ) Notice: Subject to any disclaimer, the term of this patent is extended or adjusted under 35 U.S.C. 154(b) by 132 days.

(21) Appl. No.: 10/746,976

(22) Filed: Dec. 24, 2003

(65) Prior Publication Data

US 2004/0155153 A1    Aug. 12, 2004

Related U.S. Application Data

(60) Provisional application No. 60/436,821, filed on Dec. 27, 2002.

(51) Int. Cl.
*B64D 17/52* (2006.01)

(52) U.S. Cl. ............... 244/149; 244/152; 244/151 B; 182/3; 294/82.25

(58) Field of Classification Search .............. 244/142, 244/149, 151 A, 152, 151 B, 138 R; 182/3, 182/5, 145; 294/82.25; 248/548
See application file for complete search history.

(56) References Cited

U.S. PATENT DOCUMENTS

| | | | | |
|---|---|---|---|---|
| 3,493,260 | A | * | 2/1970 | Smith |
| 4,062,581 | A | * | 12/1977 | Munscher ............... 294/82.25 |
| 4,262,865 | A | | 4/1981 | Smith |
| 4,290,637 | A | * | 9/1981 | Fischer et al. ........... 294/82.25 |
| 4,631,785 | A | * | 12/1986 | Riethmann |
| 6,056,242 | A | | 5/2000 | Collins |
| 6,421,888 | B1 | * | 7/2002 | Grenga et al. |
| 6,601,274 | B1 | * | 8/2003 | Gartsbeyn |
| 6,648,101 | B1 | * | 11/2003 | Kurtgis ........................ 182/3 |
| 6,805,220 | B1 | * | 10/2004 | Fulton et al. ................ 182/3 |

FOREIGN PATENT DOCUMENTS

| | | |
|---|---|---|
| DE | 75 02 830 U | 1/1979 |
| EP | EP 0 941 924 A | 9/1999 |

OTHER PUBLICATIONS

PARAFUN, Advance Owner's Manual, 3rd Edition, Jan. 2003, pp. 17-20, publisher—Parafun, France.
PARAFUN, web page <www.basik.fr/manuels/adv-out_manual.pdf>, accessed May 4, 2005, publisher—Parafun, France.

* cited by examiner

*Primary Examiner*—J. Woodrow Eldred
(74) *Attorney, Agent, or Firm*—Frank B. Arenas

(57) ABSTRACT

A device, system and method of reserve parachute deployment comprised of a body with a top and bottom end, a hook-slot and releasable means of attachment in communication with the hook-slot. The system and method disclose additional components and an operation of the system such that upon cutting-away a malfunctioned main parachute, the invention allows the main parachute to be the anchor in the sky to deploy the reserve parachute with no further input from the operator, while if the reserve parachute is activated without cutting-away a main parachute, the invention allows the reserve pilot chute to deploy in the convention manner with no further input from the operator.

26 Claims, 4 Drawing Sheets

SKYHOOK RESERVE PARACHUTE DEPLOYMENT SYSTEM

CROSS REFERENCE TO RELATED APPLICATION

This Nonprovisional application for patent incorporates by reference and claims the benefit of pending Provisional Application having Ser. No. 60/436,821 filed Dec. 27, 2002 for "Skyhook Reserve Parachute Deployment System," commonly owned with the instant application.

BACKGROUND OF THE INVENTION

1. Field of the Invention

The present invention relates generally to the hardware and deployment methods and systems of parachutes. The invention particularly relates to sport skydiving and military free fall and static line parachute operations. The invention more particularly relates to reserve parachute deployments that use techniques and equipment to minimize time and altitude loss required for full inflation of a reserve parachute after releasing (cutting away) a malfunctioned main parachute from a parachute harness/container system utilizing a free-bag reserve deployment system.

2. Description of the Prior Art

Parachutes have been used regularly in military and civilian applications for descents from aircraft in flight since the early 1900s. Early systems utilized only one parachute (a main parachute or main); in the event of a malfunction (improper or incomplete inflation) during deployment, tragic consequences ensued shortly thereafter due to unacceptably high impact forces on the payload upon contact with the ground. This resulted in damage or destruction if the payload was cargo; death or injury resulted in human payloads.

To increase the odds of a safe landing (especially for human payloads), an extra back-up (reserve) parachute was added to the original main parachute harness/container systems in the 1930s, increasing the reliability of the systems. Initially, these reserve parachutes were manually deployed by the jumper (skydiver) in the air after a main parachute malfunctioned. This reserve parachute manual deployment technique proved unsatisfactory, however, due to entanglements between the malfunctioned main parachute and the deploying reserve parachute. In the 1960s, sport civilian jumpers modified then-existing military releases (Capewell) which were designed solely to be released on the ground if the jumper was being dragged by the main parachute due to high winds upon landing. These modified releases were incorporated into sport parachute systems and a method was developed to enable the jumper to release (also termed break-away or cut-away) the malfunctioned main parachute and re-enter free fall prior to deploying the reserve parachute. Other improved parachute release systems ensued, including one by this same inventor (3-ring release). This generally solved the main/reserve parachute entanglement problems but introduced new problems to safe reserve parachute deployments. The first problem was the increased time and altitude needed after cut-away for the reserve to fully deploy. The increased reserve deployment time is approximately 3 seconds and increased altitude needed is approximately 300 to 500 feet for a solo jumper of average weight of 180 pounds. With the introduction of Tandem parachute systems (which carry a passenger or cargo bundle in addition to the jumper under one main/reserve parachute system), this additional time/altitude needed for Tandem systems was increased even further due to larger main/reserve parachute sizes and longer suspension line lengths. These increased time/altitude requirements for the cut-away reserve deployment systems have resulted in death or injury to jumpers who initiated the cut-away procedure at too low of an altitude to allow for full inflation of the reserve prior to impact with the ground. To decrease reserve deployment time/altitude requirements after cut-away from a malfunctioned main parachute, in the 1970s sport parachute jumpers introduced the Reserve Static Line (RSL). The RSL is a piece of pliable nylon webbing about 2 feet long, one end of which is connected to the main parachute riser(s) and the other end attached to the reserve ripcord pin. Upon cut-away of the main parachute, as the jumper falls away, the RSL is quickly pulled taut and removes the ripcord pin, allowing the reserve pilot chute to be released into the air stream. While the RSL modification pulled the reserve ripcord pin within falling 2 feet from the released main, it did nothing to decrease the actual deployment time/altitude once the reserve parachute container was opened. The disadvantage of the RSL is that upon reserve pin removal, the reserve pilot chute must still launch and inflate prior to reserve free-bag deployment, sacrificing precious altitude that may or may not be available for the jumper to land safely under a fully inflated reserve parachute.

The second flaw encountered with existing cut-away reserve deployment systems is the ability and tendency of the jumper to tumble in free fall after the cut-away and impede the reserve parachute deployment by entanglement between the jumper and deploying reserve parachute (reserve), causing a reserve malfunction with disastrous consequences. With the introduction of highly wing-loaded high-performance main parachutes in the 1980s (which have more violent malfunctions modes), this flaw prevents most experienced sport skydivers from using a RSL, preferring instead to wait to "get stable" after cut-away for proper reserve deployment. This "waiting" increases the time and altitude required for complete reserve inflation, decreasing the margin of safety with respect to cut-away altitude above ground level (AGL). Again, this unstable free fall jumper entanglement-with-reserve-after-cut-away problem is greatly magnified when used on a Tandem main/reserve parachute system. The displaced center of mass of the Tandem pair of jumpers from the cut-away suspension point tends to induce a rotational momentum (which is compounded if the malfunctioned Tandem main is spinning) and increases the chances of entanglement with the deploying Tandem reserve parachute. This exact problem recently caused 2 Tandem jumper fatalities in the U.S. At this time, only skydiving students and Tandem jumpers are mandated to use RSLs by the skydiving membership organization, United States Parachute Association (USPA) and the federal government, Federal Aviation Administration (FAA), due to these problems.

Another piece of equipment remotely related to this invention is the use by the "Sorcerer" dual canopy BASE (fixed object jumping) parachute container made by Vertigo Base Outfitters in Utah. This container system is not designed for skydiving uses from aircraft, nor is it legal to use in this country for descents from aircraft. Unlike this invention, the Sorcerer attaches the free-bag to the main risers and uses an externally mounted reserve pilot chute. Also unlike this invention, the Sorcerer does not work if the main parachute is not deployed and the reserve is opened by any means other than by operator intervention (premature deployment due to broken reserve closing loop, etc.), the system fails completely. Further unlike this invention, the Sorcerer uses a hand-deploy reserve pilot chute with no spring; the Skyhook systems uses a spring-loaded reserve pilot chute, which is the world-wide standard in the industry.

The new and useful Skyhook and Skyhook Reserve Parachute Deployment Method of this invention obviates many, if not all, of the prior art problems. The Skyhook is a unique article of manufacture and method of use that greatly reduces the time and altitude required for reserve parachute inflation after cut-away from a malfunctioned main parachute, greatly enhancing safety. First, since the Skyhook is incorporated and attached from the reserve pilot chute bridle to the main parachute via the Skyhook SL, the main parachute is utilized as the reserve pilot chute, deleting the launch time/altitude needed for a conventional spring-loaded reserve pilot chute. This reduces the time required for reserve line-stretch by approximately 66%. Secondly, it does not interfere in any way with the manual deployment of the reserve parachute by pulling the reserve ripcord. Thirdly, this invention requires no operator input to function correctly and is very simple and durable, reducing if not eliminating any mistakes or errors when rigging and packing the system into the reserve parachute container.

SUMMARY OF THE INVENTION

It is an object of the invention to save human lives by reducing the time and altitude required for reserve parachute inflation after cut-away from a malfunctioned main parachute.

It is another object of the invention to allow the invention to be functional without any input from the operator regardless of how the main parachute is deployed; hand-deploy (throw-out pilot chute/pull-out pilot chute), ripcord, static line, instructor aided deployment (IAD), automatic activation device (AAD), or even accidental deployment of any type; and to be functional regardless of the method of cut-away; single point releases, dual and multiple point releases of all types.

It is a further object of the present invention to allow the invention to be functional without any input from the operator regardless of how the reserve parachute is deployed; ripcord, AAD, RSL, ballistic launched pilot chute or even accidental deployments such as snagged RSL, snagged reserve ripcord, AAD misfire, broken reserve closing loop, or any other type deployment method.

The objects of this invention are achieved and the present invention provides a new and useful article of manufacture, system and method for use comprising a release means, the preferred embodiment of which is a Skyhook (defined as a specially designed and fabricated piece of hardware, the preferred embodiment of which is disclosed in FIG. 3 and FIG. 6) which can be integrated anywhere into the reserve bridle but preferably integrated into the reserve bridle at a location above the mid-point of the reserve bridle (relative to the pilot chute at the top end and the free-bag at the bottom end of the bridle, relative to gravity). Though it may be disposed anywhere on the parachute harness/container system, in the preferred embodiment the Skyhook is releasably disposed on the reserve parachute kicker flap (alternately it may be disposed on the reserve free-bag), one end of the Skyhook SL is attached to the RSL which further attaches to the releasable main parachute riser(s), the other end is the end-loop in contact or nearly in contact with the inside surface of the Skyhook hook-slot. The Skyhook and Skyhook end-loop have a means for resistance to resist releasing until a sufficient force is applied (such as, for example, Velcro (touch fastener), tack cord, tuck-slot, etc.). Upon cut-away from the malfunctioned main parachute, the main parachute itself acts as a "pilot chute" and is anchored in the sky by its aerodynamic drag relative to the jumper that falls away due to gravity. The full extension of the RSL pulls the reserve ripcord pin, allowing the reserve container to open and release the reserve pilot chute. The falling jumper then causes the end-loop means of the longer Skyhook SL (the other end of which is attached to the RSL or directly to at least one main riser) to reach line stretch at the hook-slot of the Skyhook, pulling on the reserve bridle and then pulling the reserve free-bag (deployment bag) containing the reserve parachute to line stretch usually before the reserve pilot chute has a chance to inflate. This greatly reduces the time and altitude required for reserve parachute inflation after cut-away as compared to the conventional method of reserve deployment using solely a standard RSL and reserve pilot chute. Optionally, the "Collin's Lanyard" (U.S. Pat. No. 6,056,242, assigned to this inventor) can be used with the Skyhook SL and RSL to ensure that both risers leave simultaneously or nearly simultaneously.

If the main parachute is not deployed at the time of the reserve container opening, the drag of the inflated reserve pilot chute instantly and automatically releases the Skyhook SL from the Skyhook hook-slot. The reserve parachute deployment is thereafter controlled by the reserve pilot chute in the conventional manner of the prior art. The Skyhook and Skyhook system is highly compact and of simple construction that is easy to actuate yet resists accidental activation.

DETAILED DESCRIPTION OF THE PREFERRED EMBODIMENT

The apparatus of the invention is conveniently fabricated by conventional and standard methods for preparing hardware and soft components of the invention using conventional and standard materials common in the industry.

For example, the body means and hook-slot means for allowing a releasable means of attachment (the preferred embodiment of which is the Skyhook specially designed piece of hardware) may be fabricated from aluminum, stainless steel or like metals or any other suitable material. The Skyhook may also be fabricated from non-metallic materials for lighter weight and stealth characteristics against radar detection for military uses. Theses non-metallic materials include, among others, conventional polymers such as, for example, polystyrene, polycarbonate, polyurethane, polyethylene, phenol formaldehyde resins, polybutylene, Teflon and the like. The connection means employed for the Skyhook SL and end-loop may be made of any type of strap, wire, cord, line, rope or webbing using Dacron, Spectra, nylon and similar materials, among others.

Figure 1:
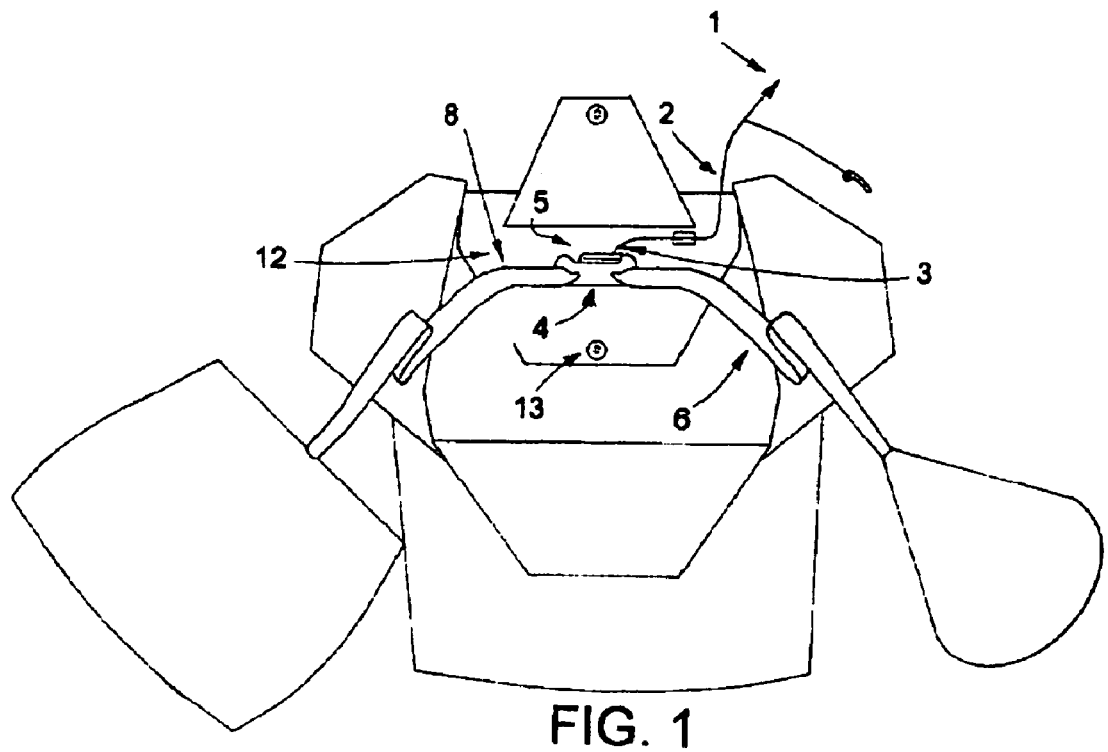
FIG. 1 is a view of the Skyhook system (revealed with the reserve container flaps opened) as installed in a reserve parachute container, disposed on the kicker flap.
Figure 2:
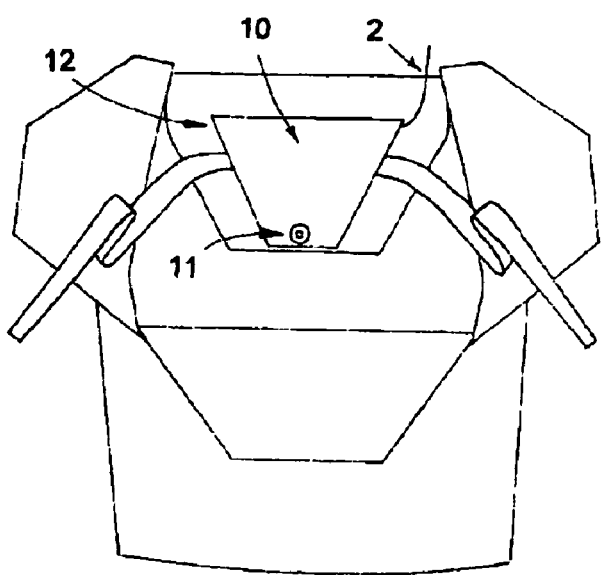
FIG. 2 is a view of the Skyhook system shown in FIG. 1, but with the cover flap of the kicker flap closed, protecting the Skyhook, Top reserve bridle, Bottom reserve bridle and lower portion of the Skyhook SL disposed thereon.

The apparatus, system and method of using the invention will now be further described and exemplified by reference to the various specific embodiments set forth in the drawings. FIG. 1 is a view of the preferred embodiment of the invention in the packed condition. The "Skyhook system" is hereby defined as the integration of the components as disclosed in this invention, including a means for connecting at least one (1) releasable main parachute riser (depicted in this particular embodiment as the RSL 1 and Skyhook SL 2) to the Skyhook 4 with a means for attachment to the hook-slot 5 (shown in this embodiment as the end-loop 3); the Top reserve bridle 6 is attached to the Top hook-hole 7 with a means for attachment and the Bottom reserve bridle 8 is attached to the Bottom hook-hole 9 with a means for attachment. The Skyhook SL 2, Skyhook 4, Top reserve bridle 6 and Bottom reserve bridle 8 are releasably disposed on the reserve container kicker flap 12 with a release means, shown in one preferred embodiment using touch-fastener material (Velcro) and protected by the cover flap 10 and secured with the reserve closing loop passing through the kicker flap closing grommet 13 and cover flap closing grommet 11 as shown in FIG. 1 and FIG. 2.

The release means on the kicker flap may be any means that secures the above-referenced components by inducing the tension necessary to keep the Skyhook SL 2 end-loop 3 firmly in the hook-slot 5 while packed to prevent movement of the components relative to each other prior to activation, while having an effective amount of force required to allow release of the components upon activation. For example, snaps, wax, break-cord tacking, Velcro (touch fastener), buttons, glue (adhesive chemicals or compounds such as silicone or latex caulk with effectively proper adhesion properties) or magnets may be used. Alternately, the Skyhook system may be releasably disposed on the reserve free-bag by the same means as described above and the kicker flap 12 used as a cover flap, or releasably disposed anywhere else in the reserve container or anywhere else on the main/reserve harness/container system. A means for resistance may be employed on or in the opening of the hook-slot 5 (for example a gate, tack cord, touch fastener, etc.) to help prevent premature release of the end-loop 3 from the Skyhook 4.

Figure 5:
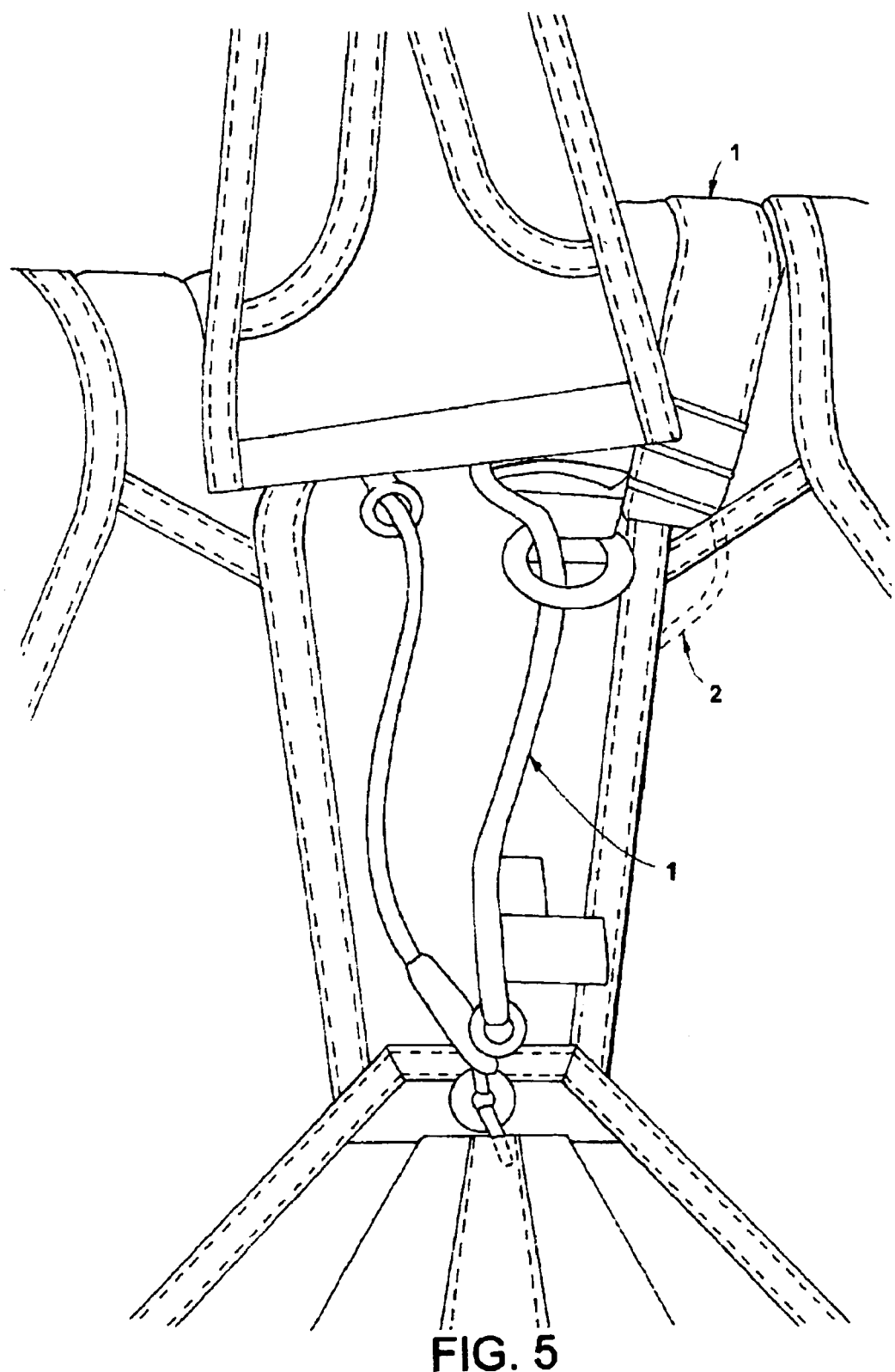
FIG. 5 depicts the Skyhook SL in "hidden view" integrated into the RSL and packed under the reserve container flaps of the parachute harness/container system.

The reserve pilot chute can then be compressed directly on top of the cover flap (or kicker flap if the Skyhook is disposed on the reserve free-bag), further securing the assembly and the reserve container flaps secured in the conventional manner with the reserve ripcord pin (as depicted in FIG. 5, with the Skyhook SL shown in "hidden view" under the reserve flaps) and attached to the RSL with an attachment means. This attachment means may include sewing, gluing, tying, sonic welding, metal (or plastic) connectors or other means to achieve sufficient strength of the attachment to perform the necessary function.

Figure 3:
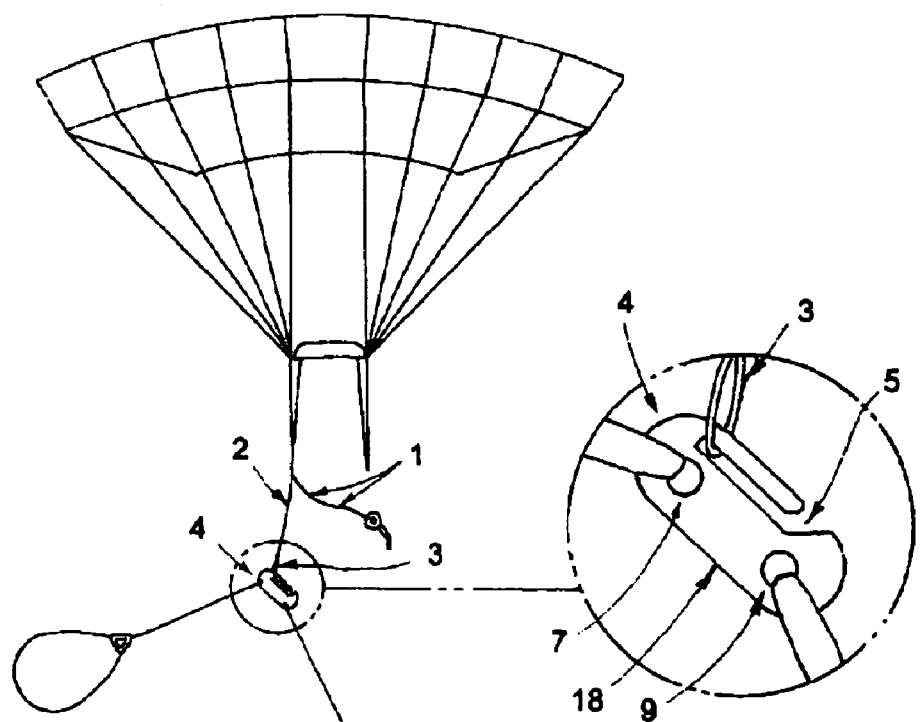
FIG. 3 depicts a "close-up" view of the Skyhook hardware piece and hook-slot, top hook-hole and bottom hook-hole integrated therein.
Figure 4:
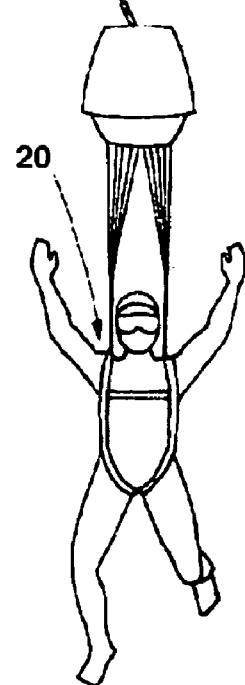
FIG. 4 depicts the Skyhook system shown in FIG. 1 and relationship of all components after the system has been actuated by the jumper and has commenced deployment of the reserve parachute by the Skyhook system.

Referring now to FIG. 3 and FIG. 4, the method of use of the invention and interaction of the Skyhook system components will be described in detail. A typical scenario for use involves first the attempted successful deployment of a main parachute by any of the conventional deployment methods of the prior art. If, during the attempted main parachute deployment by the operator (jumper/payload), the main parachute improperly inflates (or fails to inflate) causing a malfunction of the main parachute, the operator must release (cut-away) the malfunctioning main parachute to allow proper reserve deployment and inflation. Upon cut-away of the main parachute, the jumper falls away from the released main parachute due to gravity and the differential drag and dissimilar fall-rates of the released main parachute and jumper underneath. As the jumper departs from the main parachute, the RSL 1 is pulled upwards into tension, which pulls the reserve ripcord pin, allowing the reserve container to open and release the reserve pilot chute. The Skyhook SL 2 is longer than the RSL 1 and immediately thereafter pulls with upward force the end-loop 3 which is in contact or nearly in contact with the inside surface (load end 14) of the hook-slot 5 in the Skyhook 4. This upward force caused by the drag of the released main parachute is transferred to the Skyhook 4 via the RSL 1, Skyhook SL 2 and end-loop 3, thereby enabling the Skyhook 4 to lift-off the kicker flap 12 (or reserve free-bag if disposed on the free-bag), opening the cover flap 10 and pulls the Bottom reserve bridle 8 attached to the Bottom hook-hole 9 to extend the Bottom reserve bridle 8. The full extension of the Bottom reserve bridle 8 pulls the reserve canopy (parachute) contained in the reserve deployment bag (free-bag) to line-stretch and causes reserve canopy inflation, usually before the reserve pilot chute has inflated. This new and improved method reduces reserve deployment time and altitude loss substantially and greatly enhances safety as compared to the prior art deployment methods.

To pack or repack the system, the sequence of operation is reversed, using techniques and methods commonly known in the industry. With reference to all 6 drawings, the free-bag holding the packed reserve canopy and suspension lines is placed correctly in the reserve container, the kicker flap 12 closed, the Skyhook 4, Top reserve bridle 6, Bottom reserve bridle 8 and Skyhook SL 2 disposed on the kicker flap (with a means of resistance to resist premature release), cover flap 10 closed and reserve closing loop threaded through the cover and kicker flap closing grommets 11 and 13. The reserve closing loop is then routed through the closing grommets of the top, bottom, and side flaps of the reserve container and then pulled tightly into tension to align all of the closing grommets and close the reserve container. The reserve ripcord pin (which is attached to one end of the RSL 1) is then inserted into the tensioned reserve closing loop and the pack dressed in the customary manner. The Skyhook RSL 2 is routed up inside the side reserve flap and exposed to the RSL 1 attachment point, attached to the RSL 1 and the RSL 1 attached to at least one main parachute riser.

If the main canopy (parachute) is not deployed at the time of the reserve container opening, the drag of the reserve pilot chute instantly and automatically releases the Skyhook SL 2 from the Skyhook 4 hook-slot 5 (open end 15). The reserve deployment is then controlled by the reserve pilot chute in the conventional manner. This automatic quick-release feature of the Skyhook system tends to allow the system to be self-balancing between the forces created by the drag of the released main parachute and the reserve pilot chute, allowing whichever source of drag that is pulling stronger to control the reserve deployment. This balancing of forces can be accomplished by the system even during the reserve deployment sequence to affect the most efficient and safest source of drag (main parachute or reserve pilot chute) to enable the fastest reserve deployment with least loss of altitude. In fact, the design is such that if the reserve pilot chute drag force is upwards, the resistance means of the releasable means for attachment remains low to allow a quick release; while if said force is downwards, the resistance means of the releasable means for attachment increases sufficiently to prevent a premature release and to keep the reserve bridle in tension. All disclosed information, manuals, text, data, photographs, videos, drawings, facts, images, test data and knowledge by this inventor published or conveyed in printed form, any tangible medium and/or contained in and on this inventor's web site concerning this invention, as of the date of this application, at www.relativeworkshop.com including, but not limited to, all sub-pages, including pages http://www.relativeworkshop.com/general/home.html, http://www.relativeworkshop.com/products/pdt_skyhook.html, and http://www.relativeworkshop.com/support/support_manuals.html, are hereby adopted and incorporated herein by reference into these specifications and disclosure.

The Skyhook 4 hardware piece can be located anywhere along the reserve bridle, but the preferred embodiment and best mode is above the mid-point of the reserve bridle, about 72% of the length from the free-bag relative to the overall length of the reserve bridle. (For a 12 feet long reserve bridle with a reserve pilot chute on the top end and free-bag on the bottom end, the best Skyhook hardware piece location is about 7 feet from the free-bag and about 5 feet from the reserve pilot chute). This location also prevents the trailing Top reserve bridle 6 and reserve pilot chute from interfering with the reserve free-bag during deployment by the Skyhook system and (coupled with the means for resistance to resist premature release) lessens the chance of premature release of the end-loop 3 from the hook-slot 5 due to the drag of the reserve pilot chute in the wrong direction (defined as down relative to the earth's gravity field, or in closer to the gravitational center of mass of the earth). This ensures continued reserve parachute deployment by the Skyhook 4 and end-loop 3 if the reserve pilot chute is restrained for any reason.

Again referring to FIG. 4, the assembly and fabrication of the preferred embodiment of the invention will be described in detail. The system is assembled and fabricated from standard materials and methods now used in the parachute equipment manufacturing and rigging industries. Typically, the RSL 1 is a length of nylon webbing about 2 feet long, one end of which is sewn to a piece of hardware (typically a snap-shackle) that releasably attaches to or releases from at least one main parachute riser, the other end sewn with transition hardware (or directly) to the reserve ripcord handle, ripcord cable or ripcord pin. The snap-shackle allows the Skyhook system to be disengaged from the main parachute riser(s) by the operator, if desired, at any time prior to or during the parachute jump, allowing the main/reserve parachute harness/container system to be utilized in the conventional manner.

Figure 6:
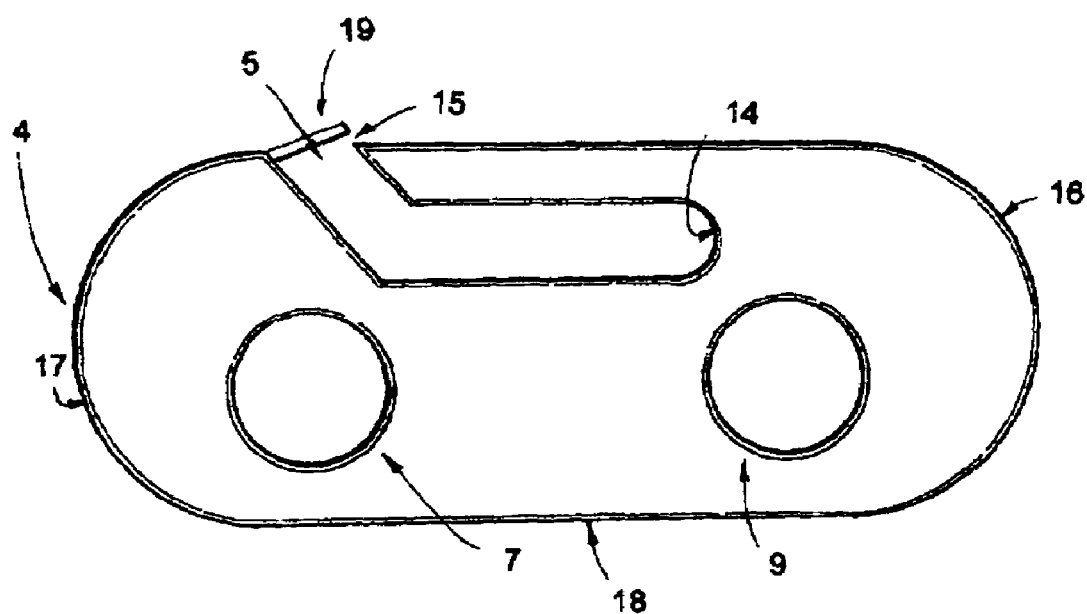
FIG. 6 further depicts the Skyhook hardware piece shown in FIG. 3.

The Skyhook SL 2 is attached to the RSL 1 (or alternately releasably attached directly to at least one main riser) as a second, but sufficiently longer branch of the RSL 1, which requires the RSL 1 (when connected to at least one main parachute riser) after cut-away via the cut-away means 20 to pull the reserve ripcord pin prior to full extension of the Skyhook SL 2 and end-loop 3. The materials typically used for the construction of the RSL 1, Skyhook SL 2 and end-loop 3 are nylon webbing and braided Dacron line of sufficient tensile strength. The Skyhook 4 is typically fabricated from aluminum, with the hook-slot 5, Top hook-hole 7 and Bottom hook-hole 9 machined using conventional machine-shop techniques such as drilling, cutting, smoothing and polishing. The reserve bridle is typically made of nylon webbing of sufficient length, width and tensile strength for its purpose and proper function. The Top reserve bridle 6 is attached to the Top hook-hole 7 easily by conventional sewing techniques after inserting a sufficient portion of the bridle through the Top hook-hole 6, folding the bridle back onto itself and sewing the junction. The Bottom reserve bridle 8 is attached to the Bottom hook-hole 9 in the same or similar manner. Or, one solid reserve bridle may be used with the Skyhook device integrated into the reserve bridle to define a top and bottom reserve bridle. This embodiment is disclosed in and on the web sites and web pages concerning this invention previously above-referenced and adopted and incorporated by reference. The preferred length of the Top reserve bridle 6 is about 28% of the total reserve bridle length, while the preferred length of the Bottom reserve bridle 8 is about 72% of the total bridle length. The top-end of the Top reserve bridle 6 is attached to the reserve pilot chute and the bottom-end of the Bottom reserve bridle 8 attached to the reserve free-bag in the conventional manner of the parachute equipment and rigging trade/industry. The Skyhook 4 is shown with its design, functional aspects and relationship of components of the Body 18, Top end of Body 16, Bottom end of Body 17, Top hook-hole 7, Bottom Hook-hole 9, hook-slot 5, load end 14, open end 15, and optional gate means 19 (one type means for resistance) in scalable form in the drawings of FIG. 3 and FIG. 6.

As will be apparent to persons skilled in the art, such as an United States of America Federal Aviation Administration (FAA) certified Master or Senior rigger, various modifications and adaptations of the structure and method of use above-described will become readily apparent without departure from the spirit and scope of the invention, the scope of which is defined in the claims. Although the foregoing invention has been described in detail by way of illustration and example, it will be understood that the present invention is not limited to the particular description and specific embodiments described but may comprise any combination of the above elements and variations thereof, many of which will be obvious to those skilled in the art. Additionally, the acts and actions of fabricating, assembling, packing, donning, using, deploying and maintaining the preferred embodiment of this invention are well known by those skilled in the art. Instead, the invention is limited and defined solely by the following claims.

What is claimed is:

1. Skyhook, an article of manufacture for reserve parachute deployment comprising:
    a body having a top end, bottom end and prong opposing a surface of the body to define a hook-slot therebetween, said hook-slot having a load end and an open end, such that a releasable means for attachment is selectively attachable and in communication with said hook-slot when attached; and
    a means for attachment at the top end of the body; and a means for attachment at the bottom end of the body, whereby when an upward force is first applied via the means for attachment at the top end of the body, the releasable means for attachment in communication with said hook-slot is released, while if an upward force is first applied to the hook-slot toad end of said hook-slot via the releasable means for attachment, the releasable means for attachment in communication with said hook-slot remains attached.

2. The device of claim 1 wherein the releasable means for attachment in communication with said hook-slot further comprises an end loop at one end of a Skyhook Static Line means in contact or nearly in contact with the said hook-slot load end.

3. The device of claim 1 wherein the means for attachment at the top end of the body further comprises a top hook-hole.

4. The device of claim 1 wherein the means for attachment at the bottom end of the body further comprises a bottom hook-hole.

5. The device of claim 1 wherein the releasable means for attachment in communication with said hook-slot further comprises a means for resistance to resist releasing until a sufficient force is applied, to prevent a premature release.

6. A system for reserve parachute deployment, said system comprising:
    (a) a dual parachute harness means and container means, main parachute means, main parachute riser means, main parachute cut-away means, reserve parachute means, reserve activation means, reserve pilot chute means, reserve bridle means, reserve free-bag means, Skyhook Static Line means further comprising an end loop end and further comprising an other end and Reserve Static Line means;
    (b) further comprising the device of claim 1 integrated into the reserve bridle means, thereby defining a top and bottom reserve bridle means, further comprising the hook-slot of the device of claim 1 in the desired orientation releasably disposed on the reserve container means when packed;
    (c) further comprising the end loop end of the Skyhook Static Line means inserted into the hook-slot in contact or nearly in contact with the load end of the hook-slot and further comprising the other end of the Skyhook Static Line means releasably attached to at least one main parachute riser means; and such that wherein a force is first applied to the load end of the hook-slot via the Skyhook Static Line means end loop after cutting-away a malfunctioned main parachute means via the cut-away means and the Reserve Static Line means has opened the reserve container means, the device of claim 1 allows the force from the cut-away main parachute means to be directed to the bottom reserve bridle means and reserve free-bag means to deploy the reserve parachute means, while if the reserve parachute means is activated without first cutting-away the main parachute means via the cut-away means, the device of claim 1 allows the force from the reserve pilot chute means and top reserve bridle means to be directed to the bottom reserve bridle means and reserve free-bag means to deploy the reserve parachute means while simultaneously or nearly simultaneously releasing the end loop of the Skyhook Static Line means from the hook-slot.

7. The system of claim 6 further comprising wherein, after cutting-away a malfunctioned main parachute means via the cut-away means and the Reserve Static Line means has opened the reserve container means, if an upward force is applied via the reserve pilot chute means and top reserve bridle means to the top end of the body of the device in claim 5, the means for resistance of the device of claim 5 to resist releasing the releasable means for attachment in communication with said hook-slot remains sufficiently low to allow release; while if during the reserve parachute means deployment the force applied via the reserve pilot chute means and top reserve bridle means to the top end of the body of the device in claim 5 is downwards, the means for resistance to resist releasing the releasable means for attachment in communication with said hook-slot increases sufficiently to prevent a premature release and to keep the reserve bridle means in tension.

8. The system of claim 6 further comprising wherein the dual parachute harness means and container means is operable with a harness means for allowing an instructor and student to descend in tandem following a free fall.

9. A method for reserve parachute deployment, said method comprising the steps of:
    (a) assembling in a predetermined configuration the components of the system of claim 6;
    (b) packing the system of claim 6 in a predetermined configuration into the dual parachute harness means and container means of the system of claim 6;
    (c) deploying the main parachute means of the system of claim 6;
    (d) cutting-away the main parachute means via the main parachute cut-away means of the system of claim 6; and
    (e) allowing the system of claim 6 to deploy the reserve parachute means with no further input from the operator.

10. The method of claim 9 further comprising wherein the dual parachute harness means and container means is operable with a harness means for allowing an instructor and student to descend in tandem following a free fall.

11. Skyhook, an article of manufacture for reserve parachute deployment comprising:
    a body of suitable length, width and height having a top end, bottom end and prong opposing a surface of the body to define a hook-slot therebetween, said hook-slot having a load end and an open end; further comprising an end loop at one end of a Skyhook Static Line selectively attachable to said hook-slot; and further comprising
    a top hook-hole at the top end of the body; and further comprising a bottom hook-hole at the bottom end of the body, whereby when an upward force is first applied the via top hook-hole at the top end of the body, the end loop at one end of the Skyhook Static Line attached to said hook-slot is released, while if an upward force is first applied to the hook-slot load end of said hook-slot via the Skyhook Static Line, the end loop at one end of the Skyhook Static Line attached to said hook-slot remains attached.

12. The Skyhook of claim 11 further comprising a top reserve pilot chute bridle attached to the top hook-hole.

13. The Skyhook of claim 11 further comprising a bottom reserve pilot chute bridle attached to the bottom hook-hole.

14. The Skyhook of claim 11 further comprising a reserve parachute free-bag attached to the bottom reserve pilot chute bridle attached to the bottom hook-hole.

15. The Skyhook of claim 11 further comprising a reserve pilot-chute attached to the top reserve pilot chute bridle attached to the top hook-hole.

16. A system for reserve parachute deployment, said system comprising:
    (a) a dual parachute harness and container system, further comprising a main parachute container and reserve parachute container, both said containers further comprising a plurality of flaps, further comprising a main parachute container activation means, further comprising a main parachute, further comprising a main parachute pilot chute and pilot chute bridle attached to the main parachute, further comprising at least one main parachute riser, further comprising at least one main parachute 3-ring release cut-away system, further comprising a reserve parachute, further comprising a reserve container activation ripcord, further comprising a reserve parachute pilot chute, further comprising a reserve pilot chute bridle, further comprising a reserve parachute free-bag, further comprising a Skyhook Static Line further comprising an end loop at one end and further comprising an other end of the Skyhook Static Line and further comprising a Reserve Static Line;

(b) the device of claim 11 integrated into the reserve pilot chute bridle, thereby defining a top and bottom reserve pilot chute bridle, further comprising the hook-slot of the device of claim 11 in the desired orientation releasably disposed on the reserve parachute container;

(c) further comprising the end loop at one end of the Skyhook Static Line inserted into the hook-slot in contact or nearly in contact with the load end of the hook-slot and further comprising the other end of the Skyhook Static Line releasably attached to at least one main parachute riser; and further comprising such that wherein a force is first applied to the load end of the hook-slot via the Skyhook Static Line end loop after cutting-away a malfunctioned main parachute via the main parachute 3-ring cut-away system and the Reserve Static Line has opened the reserve parachute container, the device of claim 11 allows the force from the cut-away main parachute to be directed to the bottom reserve bridle and reserve free-bag to deploy the reserve parachute, while if the reserve parachute is activated without first cutting-away a main parachute via the main parachute 3-ring cut-away system, the device of claim 11 allows the force from the reserve pilot chute and top reserve pilot chute bridle to be directed to the bottom reserve pilot chute bridle and reserve parachute free-bag to deploy the reserve parachute while simultaneously or nearly simultaneously releasing the end loop of the Skyhook Static Line from the hook-slot.

17. A method for reserve parachute deployment, said method comprising the steps of:
    (a) assembling in a predetermined configuration the components of the system of claim 16;
    (b) packing the system of claim 16 in a predetermined configuration into the dual parachute harness and container of the system of claim 16;
    (c) deploying the main parachute of the system of claim 16;
    (d) cutting-away the main parachute via the main parachute cut-away means of the system of claim 16; and
    (e) allowing the system of claim 16 to deploy the reserve parachute with no further input from the operator.

18. The method of claim 17 wherein the dual parachute harness and container is operable with a harness for allowing an instructor and student to descend in tandem following a free fall.

19. The device of claim 1 or 11 further comprising non-metallic materials of construction.

20. The system of claim 6 or 16 further comprising non-metallic materials of construction.

21. The system of claim 6 further comprising wherein the dual parachute harness means and container means is operable with a harness means for allowing an instructor and cargo payload to descend in tandem following a free fall.

22. The method of claim 9 further comprising;
    (f) activating the reserve activation means of the system of claim 6; and
    (g) allowing the system of claim 6 to deploy the reserve parachute means with no further input from the operator.

23. The method of claim 9 further comprising wherein the dual parachute harness means and container means is operable with a harness means for allowing an instructor and cargo payload to descend in tandem following a free fall.

24. The method of claim 17 wherein the dual parachute harness and container is operable with a harness for allowing an instructor and cargo payload to descend in tandem following a free fall.

25. The system of claim 6 further comprising the hook-slot of the device of claim 1 in the desired orientation releasably disposed on the reserve free-bag means.

26. The system of claim 6 further comprising the other end of the Skyhook Static Line means attached to the Reserve Static Line means.

* * * * *